United States Patent
Mohr et al.

(10) Patent No.: US 10,993,285 B2
(45) Date of Patent: Apr. 27, 2021

(54) HETEROGENEOUS MOBILE RADIO ARRANGEMENT FOR SUPPLYING AT LEAST ONE MOBILE RADIO CELL WITH MOBILE RADIO SERVICES

(71) Applicant: Telefonaktiebolaget LM Ericsson (publ), Stockholm (SE)

(72) Inventors: Markus Mohr, Rosenheim (DE); Robert Bieber, Rosenheim (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/971,220

(22) PCT Filed: Feb. 20, 2019

(86) PCT No.: PCT/EP2019/054215
§ 371 (c)(1),
(2) Date: Aug. 19, 2020

(87) PCT Pub. No.: WO2019/162326
PCT Pub. Date: Aug. 29, 2019

(65) Prior Publication Data
US 2021/0059014 A1   Feb. 25, 2021

(30) Foreign Application Priority Data

Feb. 21, 2018  (DE) .................... 10 2018 103 908.5

(51) Int. Cl.
*H04W 88/08*  (2009.01)
*H04W 92/12*  (2009.01)
(Continued)

(52) U.S. Cl.
CPC ........ *H04W 88/085* (2013.01); *H01Q 1/1228* (2013.01); *H01Q 1/246* (2013.01); *H04W 88/12* (2013.01); *H04W 92/12* (2013.01)

(58) Field of Classification Search
CPC ... H04W 88/085; H04W 88/12; H04W 92/12; H01Q 1/1228; H01Q 1/246
See application file for complete search history.

(56) References Cited

U.S. PATENT DOCUMENTS 9,472,956 B2  10/2016  Michaelis et al.
9,806,413 B1  10/2017  Chukka et al.
(Continued)

FOREIGN PATENT DOCUMENTS

| DE | 102008053850 A1 | 5/2010 |
| DE | 102018103908 B3 | 5/2019 |
| WO | 2014085345 A1 | 6/2014 |

OTHER PUBLICATIONS

International Search Report and Written Opinion for International Patent Application No. PCT/EP2019/054215, dated May 20, 2019, 9 pages.

(Continued)

*Primary Examiner* — Dinh Nguyen
(74) *Attorney, Agent, or Firm* — Withrow & Terranova, PLLC

(57) ABSTRACT

A heterogeneous mobile radio arrangement comprises an antenna arrangement. There is provision for at least one shielded supply cable having a first and a second end, said supply cable being designed to supply the antenna arrangement with electric power, wherein an AISG signal and mobile radio signals are transmittable via the at least one shielded supply cable. There is provision for a first and a second IP converter and a first IP device, wherein both IP converters have a respective IP connection and at least one respective signal line connection. The first IP converter is connectable by its IP connection to a superordinate IP network, and the second IP converter is connected by its IP connection to the at least one first IP device. The signal line
(Continued)

Figure 1A:
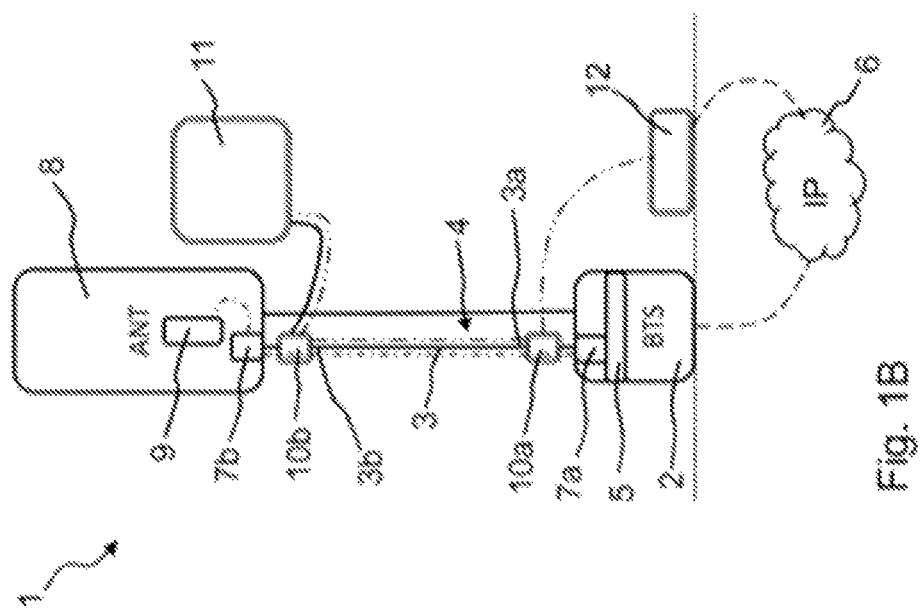

connections of the first and second IP converters are electrically connected by means of the shielded supply cable.

28 Claims, 12 Drawing Sheets

(51) Int. Cl.
    *H04W 88/12*     (2009.01)
    *H01Q 1/24*     (2006.01)
    *H01Q 1/12*     (2006.01)

(56) References Cited

U.S. PATENT DOCUMENTS

2012/0038513 A1    2/2012   Li et al.
2015/0244069 A1    8/2015   Moon et al.

OTHER PUBLICATIONS

Author Unknown, "Control interface for antenna line devices," Antenna Interface Standards Group Standard No. AISG v2.0, Protocol Specification AISG v2.0 Draft 4, AISG Ltd., Jun. 13, 2006, 41 pages.
Author Unknown, "Base Standard AISG v3.0 v3.0.0.10," Antenna Interface Standards Group, Base Standard AISG v3.0, v3.0.0.10, AISG Ltd., Nov. 5, 2018, 189 pages.
Author Unknown, "IEEE 1901," https://en.wikipedia.org/wiki/IEEE_1901, accessed Aug. 2020, 6 pages.
Author Unknown, "IEEE 802.3," https://en.wikipedia.org/wiki/IEEE_802.3, accessed Aug. 2020, 6 pages.

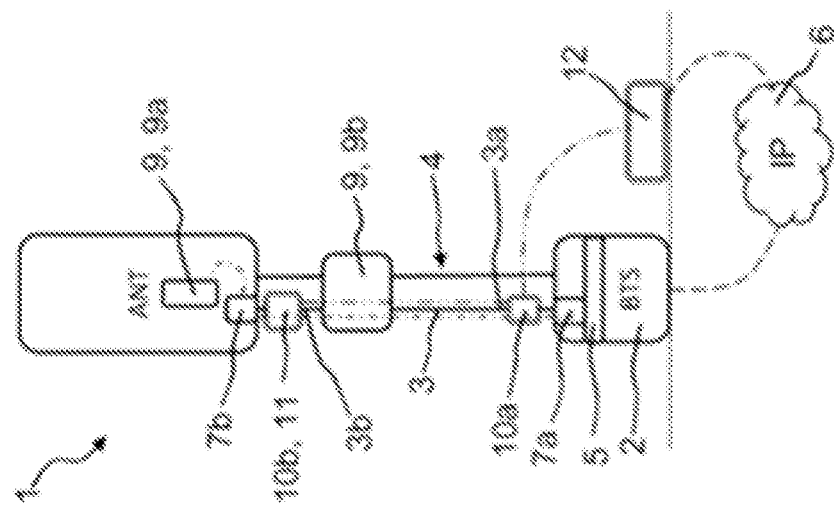
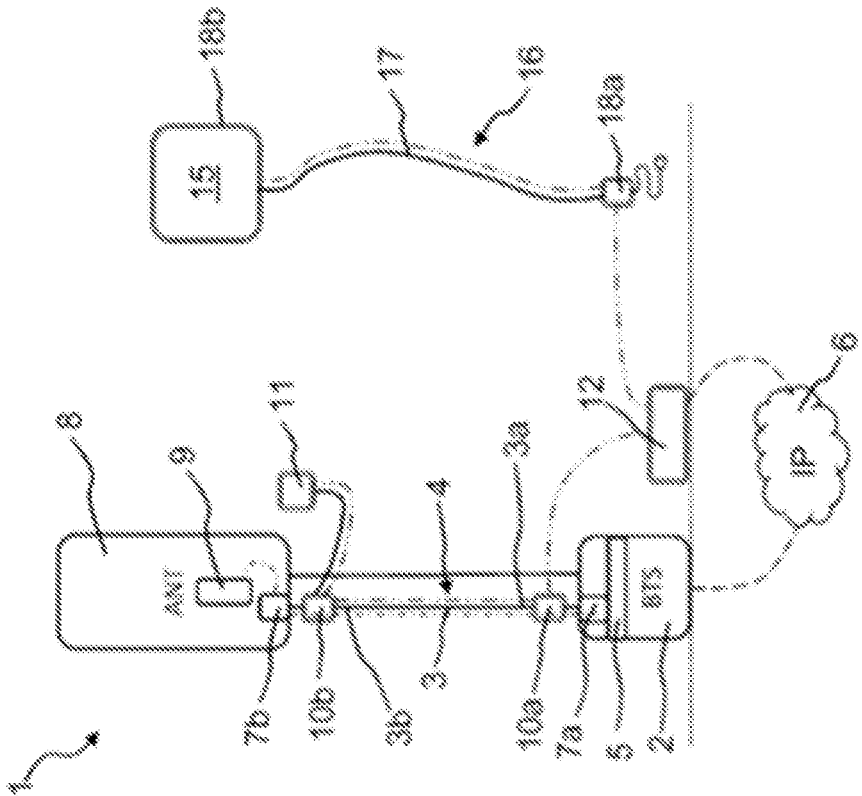

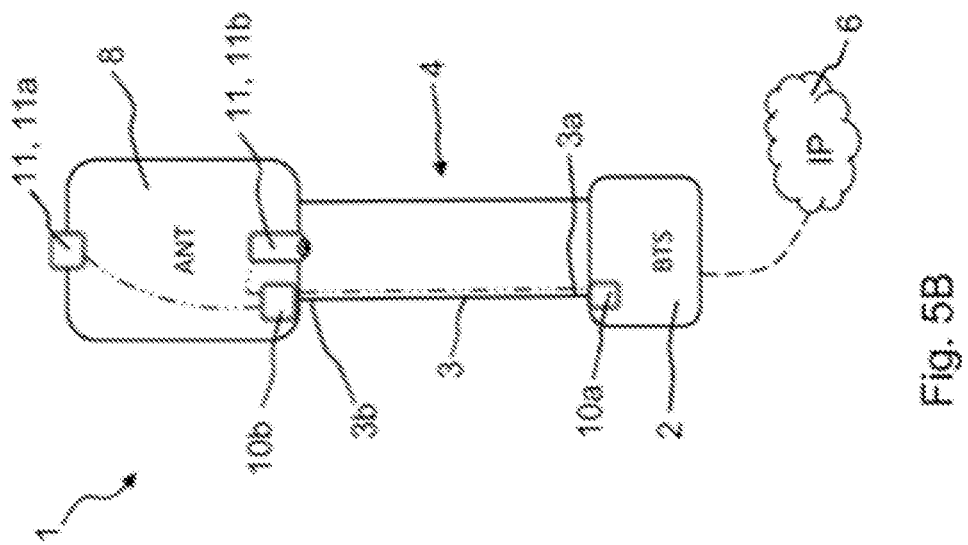
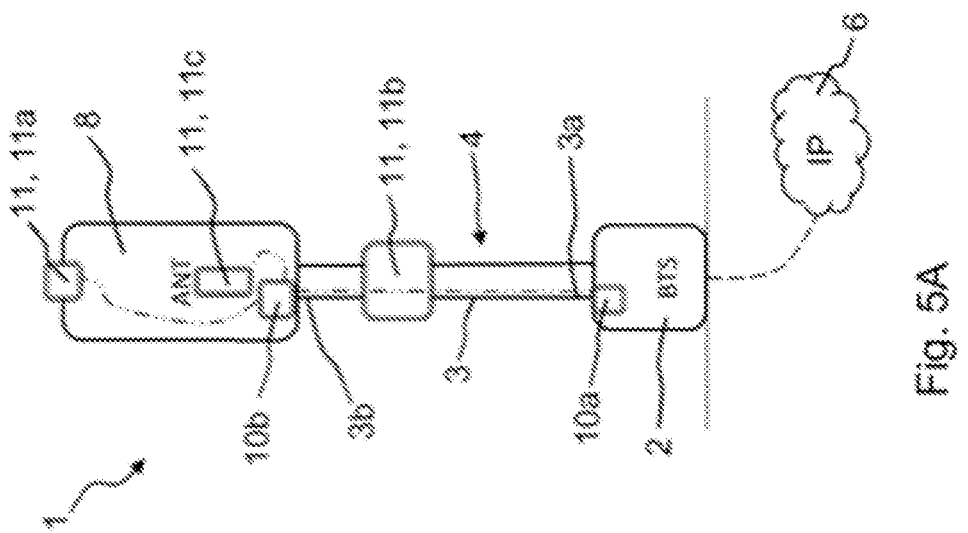

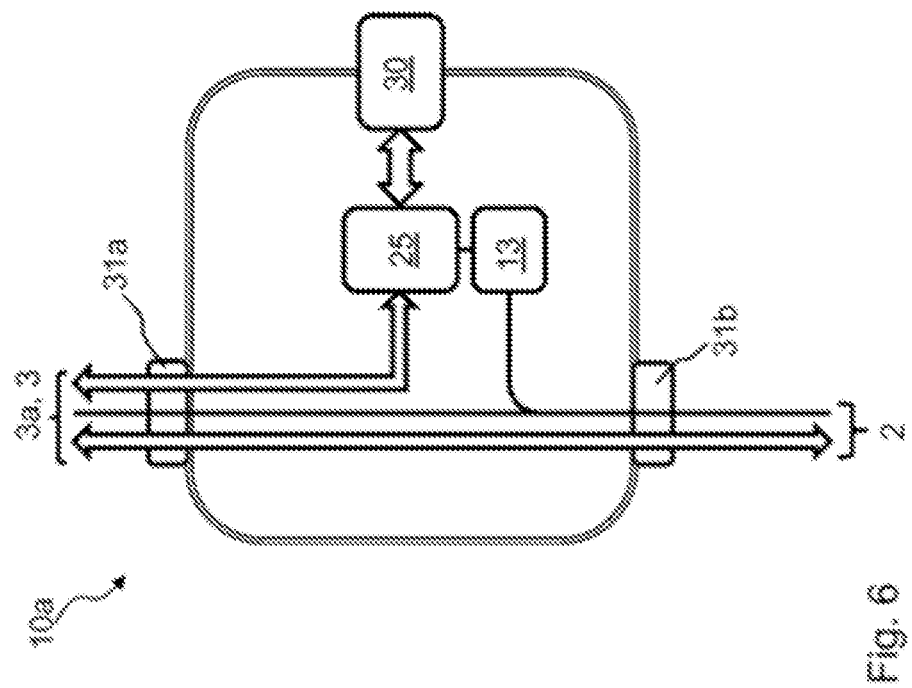
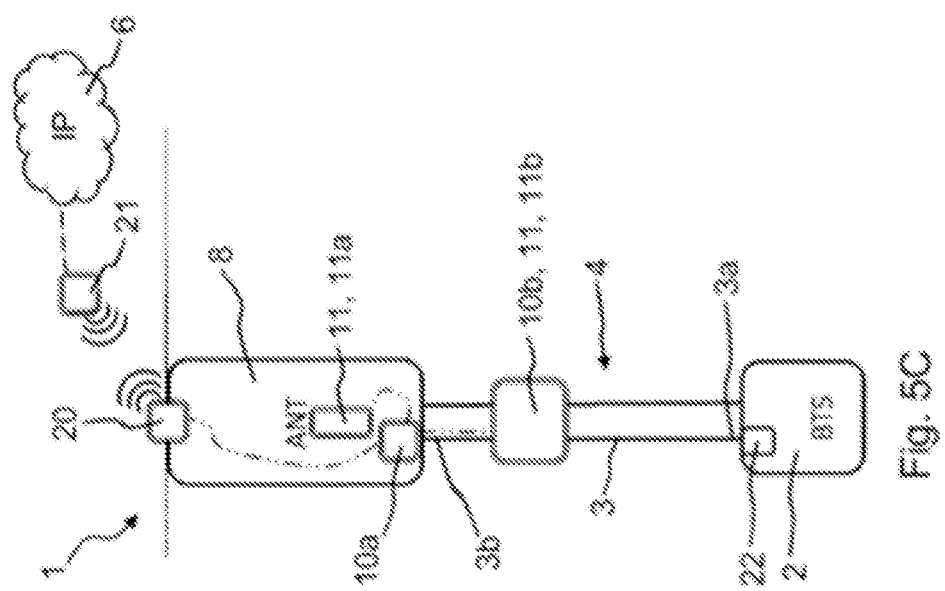

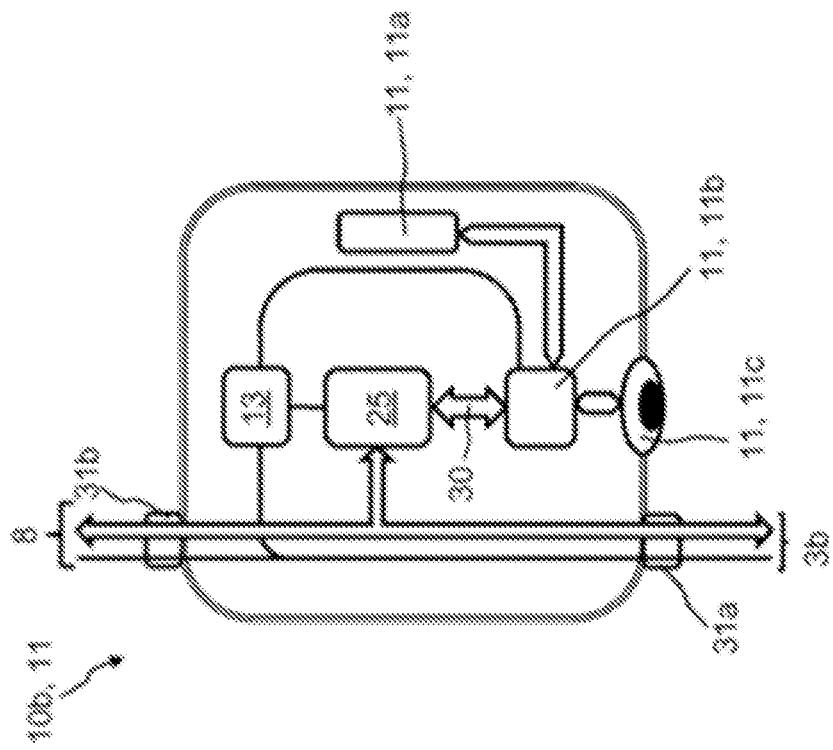
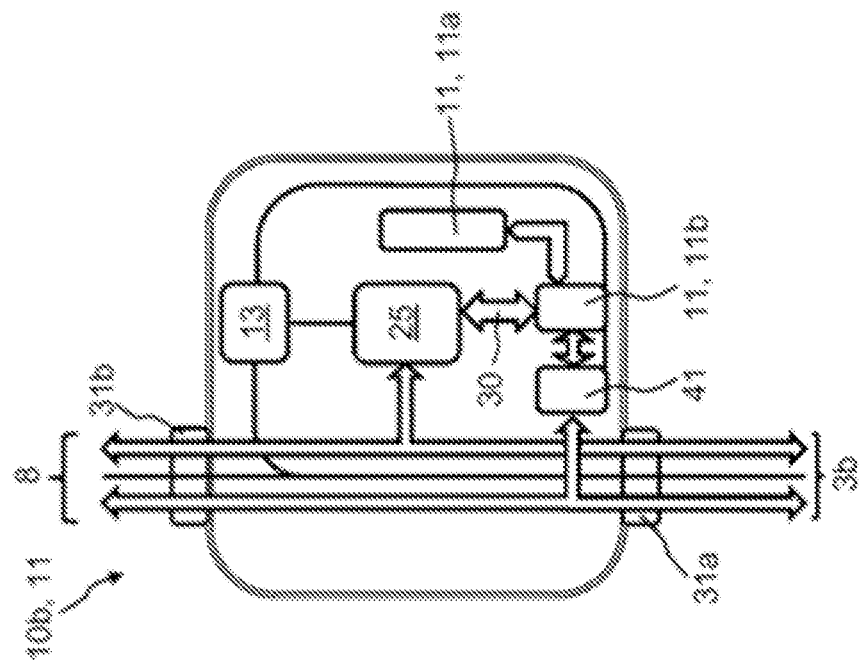

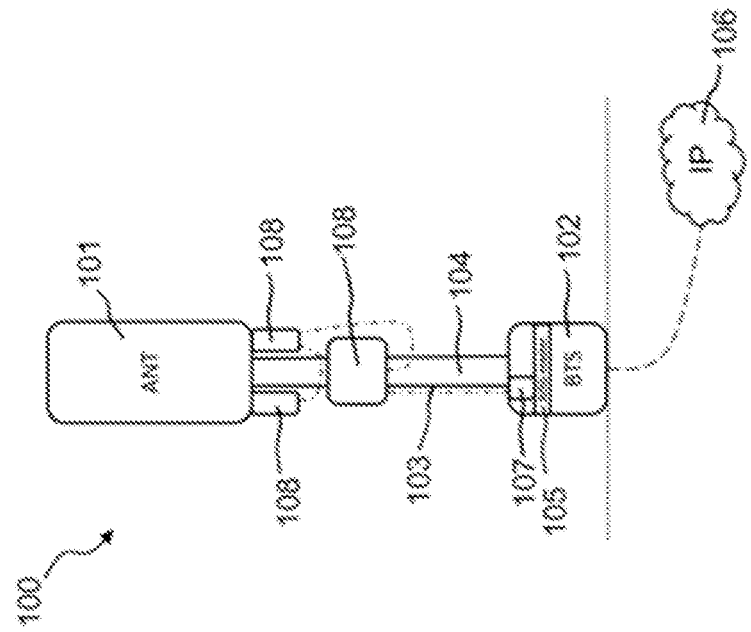
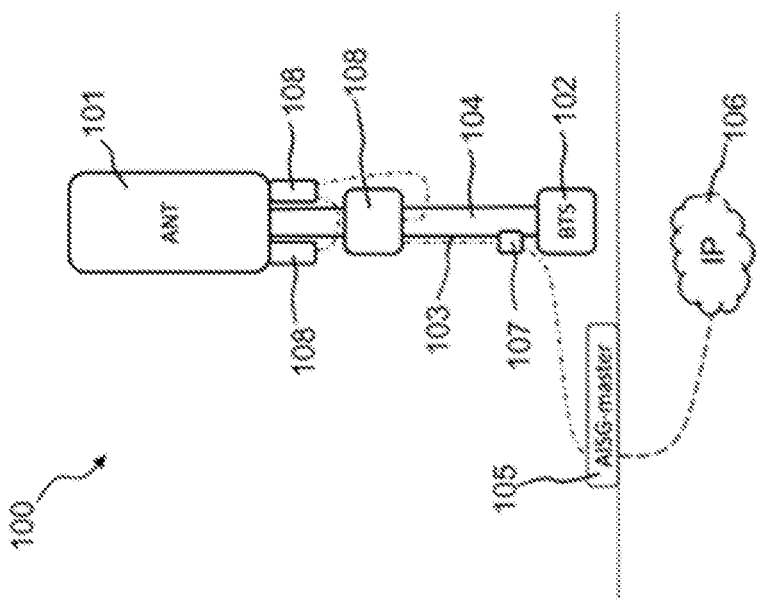

HETEROGENEOUS MOBILE RADIO ARRANGEMENT FOR SUPPLYING AT LEAST ONE MOBILE RADIO CELL WITH MOBILE RADIO SERVICES

This application is a 35 U.S.C. § 371 national phase filing of International Application No. PCT/EP2019/054215, filed Feb. 20, 2019, which claims the benefit of German Patent Application No. DE 10 2018 103 908.5, filed Feb. 21, 2018, the disclosures of which are incorporated herein by reference in their entireties.

The invention relates to a heterogeneous mobile radio arrangement for supplying at least one mobile radio cml with mobile radio services.

Mobile radio arrangements that are currently in use comprise an antenna arrangement that is supplied with power and mobile radio signals from a base station. In most cases, the antenna arrangement is mounted on an antenna mast in order to provide mobile radio services to the largest possible area. The base station is usually arranged on the ground and connected to the antenna arrangement via an appropriate supply cable. Such an antenna arrangement also comprises additional components that can be controlled by the operator of the mobile radio arrangement. For example, the down-tilt angle of the antenna arrangement can be adjusted to the particular requirements during operation in order to optimally set the cell size. It is also possible for the operator to control an amplifier, especially in the form of a tower-mounted amplifier, appropriately, for example by switching it on or off. The control signals required for this can be transmitted to the base station, converted if necessary, and forwarded by the base station to the devices to be controlled on the antenna mast. In principle, for this purpose, an appropriate cable could be laid to the devices to be controlled. In practice, the use of such a separate control line is problematic for various reasons. On the one hand, such a control line has to be installed additionally, which requires time and money. On the other hand, the antenna masts are nowadays often already very densely occupied, so that such an additional control line cannot be attached to existing antenna masts, or can only be attached with considerable effort. Another problem, which should not be underestimated, is that, for example if the shielding is inadequate, interference signals from these control lines can still be coupled into the antenna arrangement, which could be detrimental to the quality of mobile radio services.

Figure 14C:
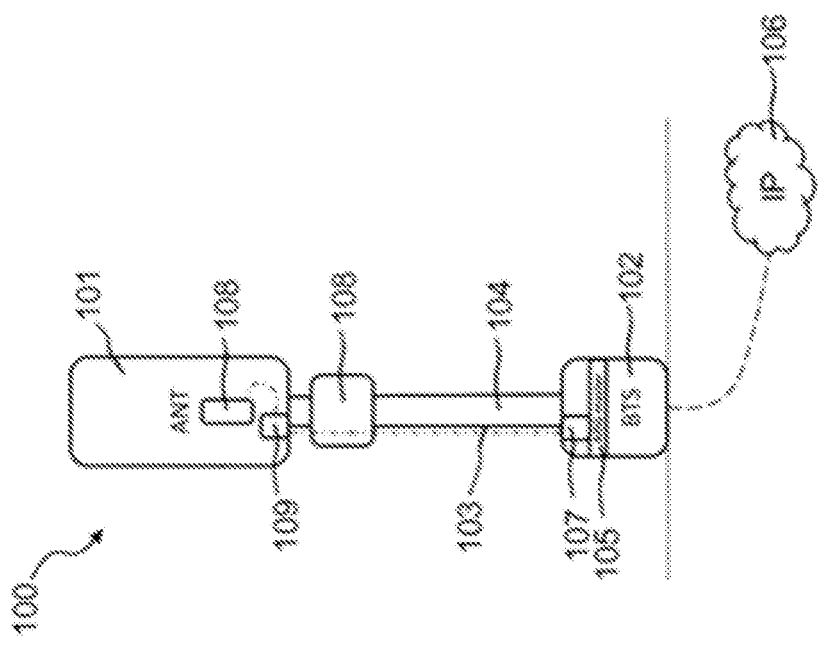

For these reasons, the AISG standard (Antenna Interface Standards Group; http://www.aisg.org.uk/| for example AISGV2* and AISGv3*) was created. This standard stipulates that the control signals are transmitted, inter alia, via the same supply cable via which the mobile radio signals and the corresponding supply voltage are transmitted to the antenna arrangement. In this case, a so-called AISG master controls one or more AISG slaves, which are arranged on the antenna mast or directly in the at least one antenna arrangement. The corresponding control signal is transmitted via the supply cable using an on/off keying procedure. A frequency of 2.176 MHz is provided for this purpose, which is below the frequencies used for mobile radio services. The level for the on/off keying signal is at most +5 dBm (on signal) and −40 dBm (off signal). The corresponding control data can be transmitted at a data rate of 9.6 kbit/s, for example. FIGS. 14A, 14B and 14C show an exemplary structure which illustrates the functionality of a control system using AISG commands. The mobile radio arrangement 100 shown there comprises an antenna arrangement 101 and a base station 102. The base station 102 is used to generate mobile radio signals (RF signals), which are emitted via the antenna arrangement 101. Conversely, mobile radio signals received by the antenna arrangement 101 can be transmitted to the base station 102 for further evaluation or processing. A connection between the base station 102 and the antenna arrangement 101 is established via a supply cable 103. An AISG master 105 can be used to control additional devices 108, which are arranged, inter alia, on the antenna mast 104, such as TMAs (Tower-Mounted Amplifiers), ACUs (Antenna Control Units) and RET units (for example Antenna Tilt Control Devices). This AISG-Master 105 is for example connected to a superordinate IP network 106. Via this superordinate IP network 106, the mobile network operator can transmit appropriate control commands to the AISG Master 105. In FIG. 14A, the AISG Master 105 is arranged, for example, near the base station 102. In FIGS. 14B and 14C, the AISG Master 105 is integrated in the base station 102. FIG. 14A also shows an AISG converter 107, which can also be referred to as an AISG-SBT (AISG-Smart Bias Tee). The AISG master 105 transmits the control data mostly via an RS-485 interface to the AISG converter 107. The AISG converter 107 converts these data into an on/off keying signal and transmits it via the supply cable 103. The corresponding devices 108 to be controlled, which can also be referred to as AISG slaves 108, are arranged on the antenna mast 104. These AISG slaves 108 receive the control commands from the AISG master 105 and perform the corresponding operations.

FIG. 14B shows that the AISG converter 107 is also integrated in the base station 102, and the base station 102 is connected to the superordinate IP network 106. FIG. 14C also shows that, for example, the AISG slaves 108 are integrated in the antenna arrangement 101, and that there is another AISG converter 109, which is also integrated in the antenna arrangement 101.

An exemplary mobile radio arrangement is also known from US 2015/0244069 A1. Antennas are connected to a base station via a supply cable. Control signals for a RET unit, which is mounted on the antennas, are also transmitted via the supply cable. These control signals are AISG signals.

DE 10 2008 053 850 A1 describes a mobile radio arrangement comprising a multiplicity of base stations and a multiplicity of antenna groups, wherein the antenna groups are assigned one to each base station. The base stations use a common supply cable to communicate with their respective antenna groups and other devices of the antenna groups. The AISG standard is used for communication with the other devices. A multiplexer circuit at the base station and a multiplexer circuit at the antenna ensure that the corresponding control signals (AISG signals) from a base station are also fed to the correct antenna group, and vice versa.

US 2012/0038513 A1 discloses a communication system to send control signals to a mobile radio arrangement. These control signals can be used to control devices of the mobile radio arrangement using the AISG standard. The communication system comprises a server that receives commands from a user, converts them accordingly, and sends them to the mobile radio arrangement.

A disadvantage of using the AISG standard, which can be used, for example, in the mobile radio arrangement according to FIG. 14A to 14C, is that extensions and changes of the AISG standard are very lengthy and ultimately only the manufacturer of the corresponding base station/AISG master decides which version of the AISG standard and which device types of the AISG standard it supports.

This leads to the problem that additional devices, which would provide an additional desirable functionality on the antenna mast, cannot simply be controlled via existing control connections. Thus, the AISG standard lists the controllable AISG slaves conclusively, and the use of new AISG slaves would require a change of the AISG standard, and therefore in turn the manufacturer of the base station/ AISG master would ultimately have to support the latest version of the AISG standard in order for additional devices to be operated. However, this complex standardization is not implemented in principle, and therefore the desired additional devices cannot be installed, also because, as mentioned at the outset, there is simply no room for additional control lines on the antenna mast, or because the operation of the new devices via new control lines would interfere with the mobile radio signals to be transmitted.

The object of the present invention is therefore to create a possibility to upgrade an existing mobile radio arrangement as easily as possible, in such a way that additional devices not listed in the AISG standard can be installed and controlled in a very simple way. This object is achieved in accordance with the invention by the heterogeneous mobile radio arrangement according to claim 1. Advantageous further refinements of the heterogeneous mobile radio arrangement according to the invention are described in the dependent claims.

The heterogeneous mobile radio arrangement according to the invention is used to supply at least one mobile radio cell with mobile radio services (for example voice, data). It comprises at least one antenna arrangement, wherein the at least one antenna arrangement comprises a multiplicity of radiating elements which are arranged in an antenna housing (radome). The antenna arrangement is designed, in particular, to transmit and/or to receive in two linear, circular or elliptical polarizations. Preferably, at least one antenna mast or antenna holder is provided, to which the at least one antenna arrangement is attached. Furthermore, at least one shielded supply cable is provided (for example coaxial structure with at least one inner conductor and one outer conductor spaced apart by at least one dielectric), which comprises a first and an opposite, second end. The at least one antenna arrangement is supplied with electric power via this shielded supply cable. An AISG signal and mobile radio signals are also transmittable via this shielded supply cable. In order to be able to connect additional terminal devices, at least one first and one second IP converter are provided in addition to such at least one first IP device, wherein both IP converters each have a respective IP connection and at least one respective signal line connection. The IP converter can also be referred to as an IP-SBT (Internet Protocol Smart Bias Tee). The first IP converter is connectable or connected at least indirectly (via a switch/router) by its IP connection to a superordinate IP network, whereas the second IP converter is connected by its IP connection to the at least one first IP device. The signal line connection of the first IP converter and the signal line connection of the second IP converter are electrically connected directly or indirectly to the at least one shielded supply cable, the AISG signal and the mobile radio signals also being transmittable via this shielded supply cable, and the electric power supply of the at least one antenna arrangement also being ensured via this shielded supply cable. In this way, data, in particular IP data, can be exchanged between the superordinate IP network and the at least one first IP device.

A particular advantage is the fact that a first and a second IP converter are additionally used, which are connected to the shielded supply cable. This allows the existing shielded supply cable to be used to connect additional IP devices to a superordinate IP network. An additional cable, which cannot be installed in all constellations and, in addition, may interfere with the mobile radio signals, is not necessary. Due to the fact that IP converters (Internet Protocol) and IP devices are used, it is possible to revert to standardized protocols, and IP devices already developed can be used.

To extend the functionality of the mobile radio arrangement, an extension of the AISG standard is no longer absolutely necessary. The AISG environment does not need to be changed. The wording "heterogeneous mobile radio arrangement" means that, on the one hand, the at least one supply cable can be used to control new types of terminal devices whose control commands cannot be transmitted via the AISG protocol. This includes, for example, the possibility that corresponding IP data (in different modulation) can be transmitted via the supply cable. At the same time, at least one voltage supply, in particular in the form of a DC voltage for the at least one antenna arrangement, shall be possible via the supply cable. In addition, mobile radio signals and AISG signals can be transmitted via the shielded supply cable. Preferably, IP data, a supply voltage, AISG signals and mobile radio signals can be transmitted via the shielded power cable. The term "IP converter" shall be understood to mean that it performs, in particular, a layer 1 conversion between its IP connection and its at least one signal line connection. This applies both for the first IP converter and for the at least one second IP converter. A layer 1 conversion refers to the OSI layer model.

In particular, the at least two IP converters perform a conversion of an Ethernet protocol (for example IEEE 802.3) into a narrowband IOT protocol (for example IEEE P1901.2). Preferably, the first and the second IP converter are designed to receive and process data in an IP4 protocol and/or in an IP6 protocol at their IP connections.

The first and the second IP converter are designed, in particular, to exchange IP data with each other via the at least one shielded supply cable, wherein the IP data are transmitted at a frequency of less than 20 MHz, 15 MHz, 10 MHz, 5 MHz, 1 MHz, 750 KHz or 500 KHz. This ensures that the mobile radio signals are not affected. The data are not transmitted via the supply cable in an IP protocol, but in a narrowband IOT protocol. Nevertheless, reference will be made to IP data throughout the following.

In a further preferred embodiment of the invention, the first and the at least one second IP converter are designed to exchange IP data with each other via the shielded supply cable, the signal level being lower than the signal level of an AISG signal, which can also be transmitted via the same at least one shielded supply cable. In particular, the signal level should be less than −40 dBm, because the off level of an on/off keying signal (AISG signal) may have this level as the lowest level. In principle, it would also be possible here that the IP data are not transmitted in the frequency range in which the AISG signal is transmitted. This could be achieved by appropriate filtering.

In order to provide a design that is as compact as possible, in a further embodiment the second IP converter is integrated in the at least one first IP device, or vice versa.

In a further embodiment according to the invention, the IP device is a 5G repeater, wherein this is arranged on the antenna mast or on the antenna holder with the at least one antenna arrangement. In this case it is supplied with IP data via the second IP converter. Alternatively or in addition, a further 5G repeater can be provided, which is arranged at another antenna mast or another antenna holder. This further 5G repeater is supplied with power via a further supply cable, wherein a feed antenna is provided on the antenna mast or antenna holder with the at least one antenna arrangement and is directed towards and feeds the further 5G repeater at the further antenna mast or antenna holder. In addition or alternatively, a further first IP converter is provided, which is connected to the, or a, further superordinate IP network. A further second IP converter is integrated in, or attached to, the 5G repeater. The further IP converters are designed to exchange IP data via their signal transmission connections and the further supply cable, whereby the further 5G repeater is connected or connectable to the further superordinate IP network.

In a further embodiment according to the invention, at least one power supply device is also provided, which is designed to generate or provide a (suitable) supply voltage (in particular a direct voltage). This power supply device is connected indirectly or directly to a first end of the at least one shielded supply cable, a second end of the at least one supply cable being connected indirectly or directly to the at least one antenna arrangement, via which said antenna arrangement can be supplied with electric power. The power supply device can also be integrated in a base station, for example.

The first IP converter is arranged in particular between the power supply device and the first end of the at least one shielded supply cable, and is connected by its at least one signal line connection indirectly or directly to the first end of the at least one shielded supply cable. The first IP converter is designed (in addition to the coupling in and out of the modulated IP packets) to loop through the supply voltage from the power supply device to the first end of the at least one shielded supply cable. In principle, it would also be possible for the first IP converter to be integrated in the power supply device. In this case, the power supply device would be directly connected to the first end of the at least one shielded supply cable. In the case that the first IP converter is designed as separate hardware next to the power supply device, the connection is only an indirect connection. The IP converter is also designed to loop through AISG signals and mobile radio signals accordingly.

In a further embodiment according to the invention, the second IP converter is arranged between the second end of the at least one shielded supply cable and the at least one antenna arrangement. The second IP converter is connected by its at least one signal line connection indirectly or directly to the second end of the at least one shielded supply cable and is designed to loop through the supply voltage from the second end of the at least one shielded supply cable to the at least one antenna arrangement. In this case as well, AISG signals and/or mobile radio signals are still looped through.

In another preferred embodiment, the second IP converter also includes a supply device, which can also be referred to as an IP power supply device. This is designed to draw a supply voltage from the at least one shielded supply cable, to adjust the voltage optionally, and to make it available to the IP device (at its IP connection). This is achieved in particular via the Power-over-Ethernet standard (IEEE 802.3AF or 802.3AT).

The heterogeneous mobile radio arrangement according to the invention also includes, in particular, a base station which is designed to generate the mobile radio signals in the appropriate mobile radio frequencies. The at least one shielded supply cable is connected by its first end indirectly or directly to the base station and by its second end indirectly or directly to the at least one antenna arrangement. In this case, preferably an AISG master is also provided, which can, for example, be directly integrated in the base station. It can also be designed as separate hardware next to the base station. To match this, there is at least one AISG slave, which is integrated in the at least one antenna arrangement or is generally arranged on the antenna mast or the antenna holder. AISG data can be transmitted on the at least one shielded supply cable between the AISG master and the at least one AISG slave in an on/off keying procedure. This on/off keying signal can be generated by a first AISG converter. This converter is connected to the AISG master via a first signal line connection and via its second signal line connection indirectly or directly to the first end of the at least one shielded supply cable. The term "AISG converter" means that it is designed to perform a layer 1 conversion between both signal line connections. For example, the AISG data is received or sent by the AISG master via an RS485 bus and is transmitted via the supply cable in an on/off keying procedure.

In the context of this invention, the word "converter" always means that a layer 1 conversion is performed. This first AISG converter may, for example, also be directly integrated in the AISG master and thus, for example, directly in the base station. However, it can also be designed as separate hardware next to the AISG master and next to the base station and can be connected via its first signal line connection to the AISG master.

The first AISG converter is designed to loop through mobile radio signals between the base station and the first end of the at least one shielded supply cable. The same should apply also for the supply voltage.

In an embodiment of the invention, the AISG slave is directly designed to receive and evaluate AISG data in an on/off keying procedure. Preferably, however, a second AISG converter is provided, which is connected via a first signal line connection to the AISG slave and via its second signal line connection indirectly or directly to the second end of the at least one shielded supply cable. The second AISG converter is also designed to perform a layer 1 conversion between both signal line connections and to transmit AISG data in an on/off keying procedure via the at least one shielded supply cable. The second AISG converter is, for example, directly integrated in the AISG slave, or is arranged in or at the at least one antenna arrangement, or is arranged on the antenna mast or antenna holder.

In a further embodiment according to the invention, the at least one first AISG converter and the at least one first IP converter are integrated in a common device. The same may also apply for the second AISG converter and the second IP converter.

Figure 1B:
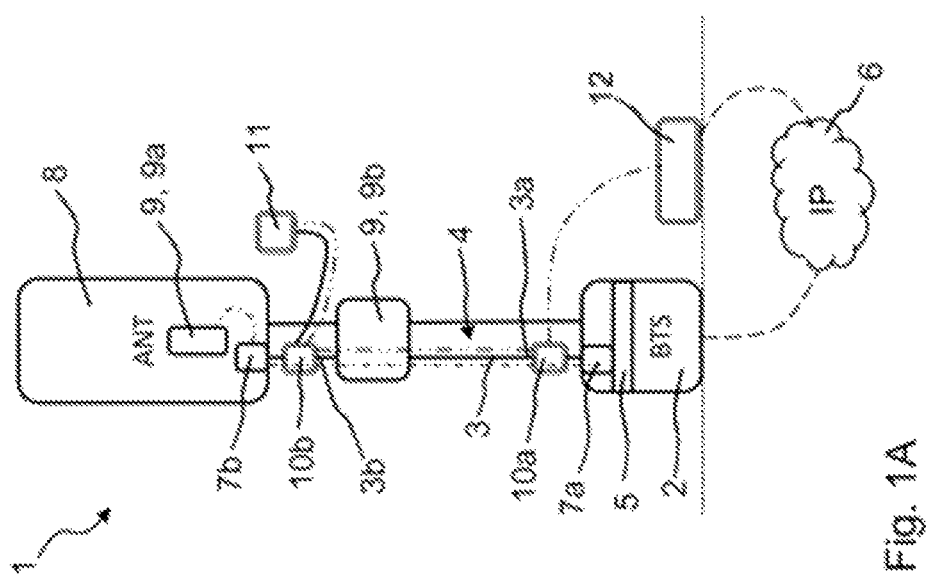
Figure 3:
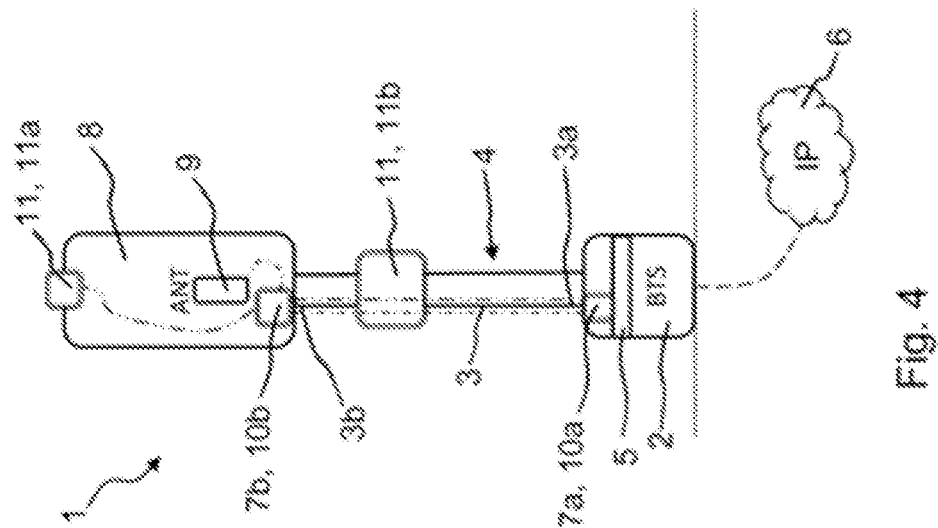
Figure 8A:
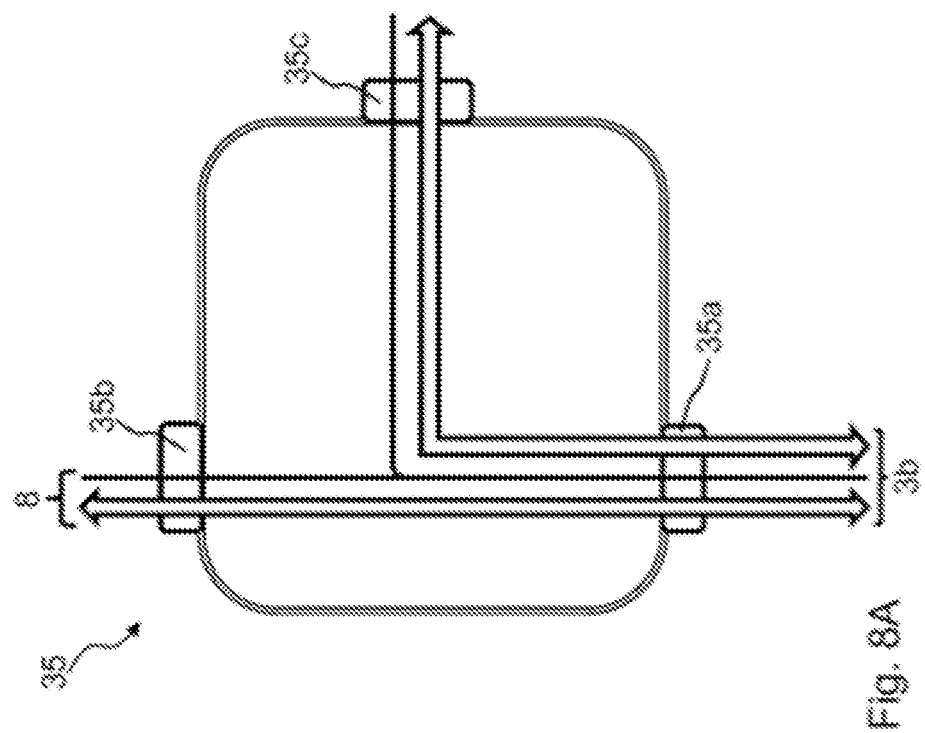
Figure 9:
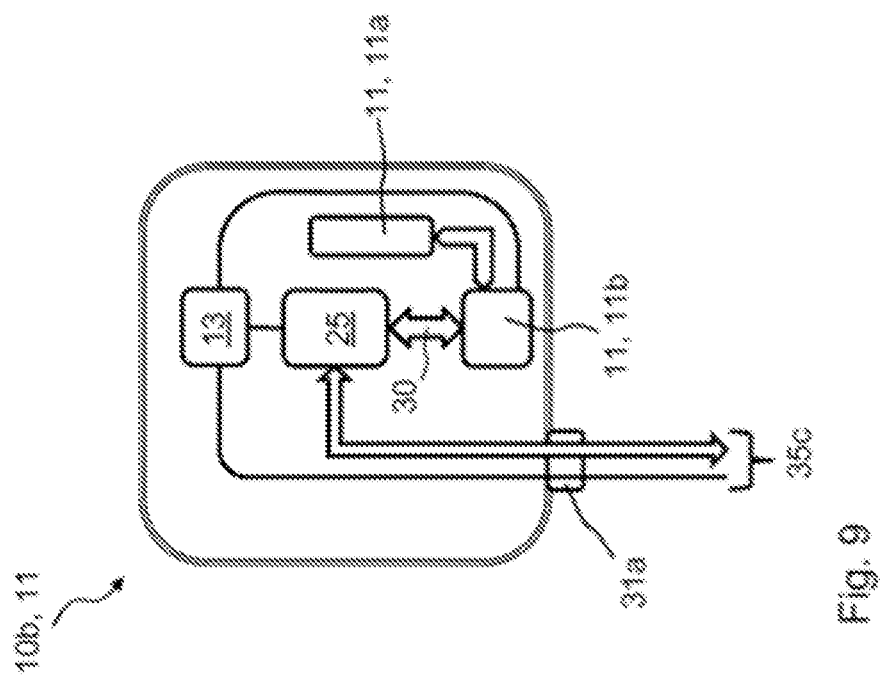
Figure 8B:
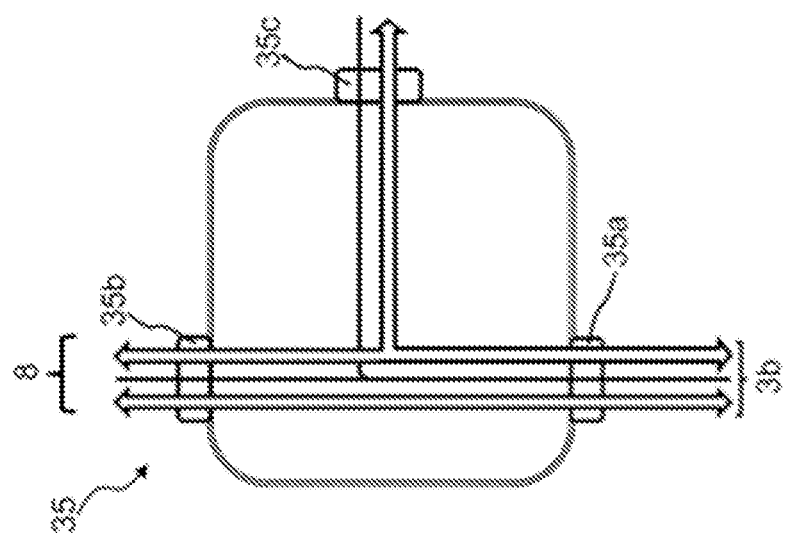
Figure 13:
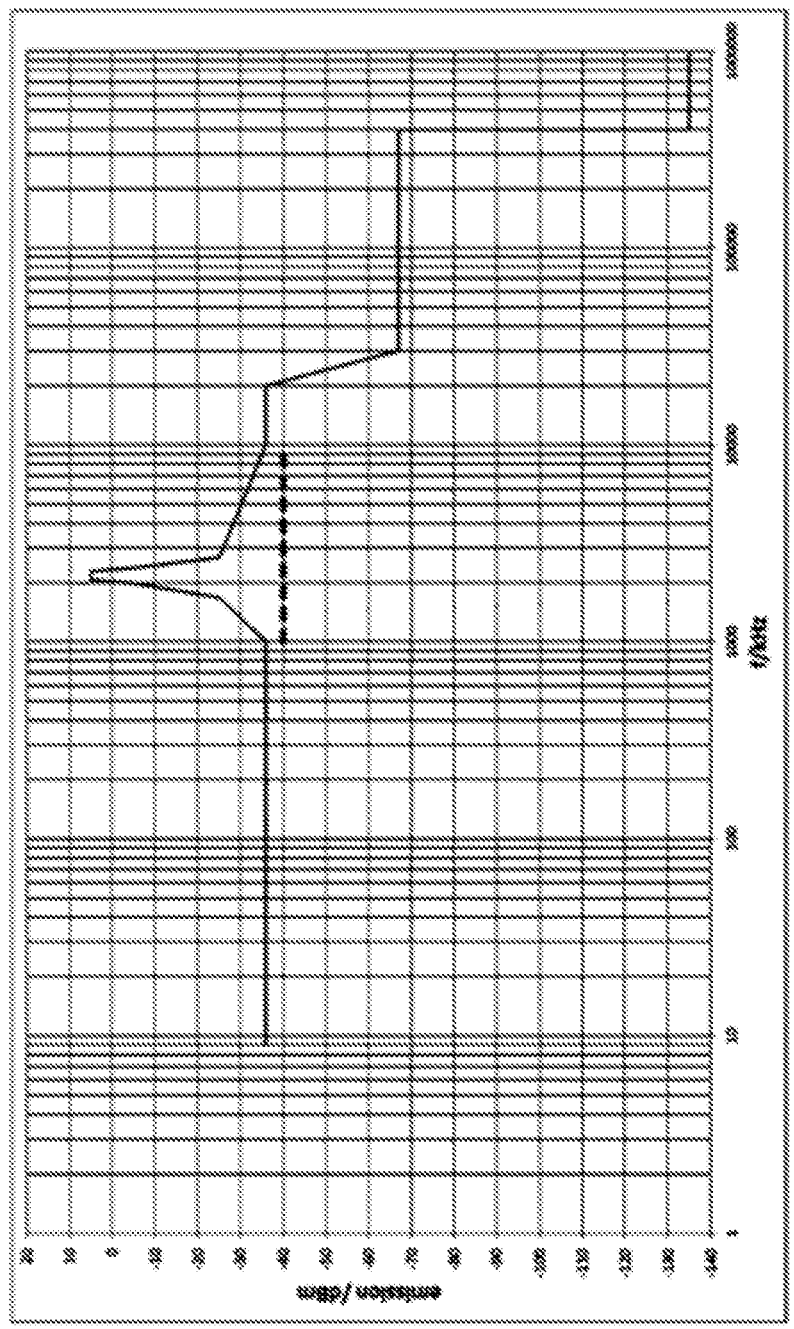

Various embodiments of the invention are described below by way of example, with reference to the drawings. Like objects have the same reference signs. The corresponding drawings show, in detail:

FIGS. 1A, 1B, 1C: various embodiments of the heterogeneous mobile radio arrangement according to the invention, wherein IP data are also transmitted via the supply cable for the antenna arrangement;

FIG. 2: another embodiment of the heterogeneous mobile radio arrangement according to the invention, wherein the IP device contains an IP converter;

FIG. 3, 4: further embodiments of the heterogeneous mobile radio arrangement according to the invention, wherein a first IP converter is designed as a separate device and is integrated in the base station;

FIG. 5A, 5B, 5C: various embodiments of the heterogeneous mobile radio arrangement according to the invention, wherein only IP devices, and no AISG slaves are used;

FIG. 6, 7: an embodiment each of a first and a second IP converter;

FIG. 8A, 8B: various embodiments of an IP switch;

FIG. 9, 10, 11A, 11B, 12: various embodiments showing an IP device in which a second IP converter is integrated;

FIG. 13: a graph describing the frequency and the signal strength of an AISG signal; and FIG. 14A, 14B, 14C: various block diagrams of a mobile radio arrangement, which illustrate in more detail the control by an AISG signal.

The following drawings are block diagrams of various embodiments of the heterogeneous mobile radio arrangement 1 according to the invention for supplying at least one mobile radio cell with mobile radio services. Blocks within a drawing which have a double border process IP data or IP data packets, whereas blocks which only have a single border are used to process AISG data or mobile radio data, i.e. mobile radio signals. In later drawings, embodiments according to the invention are also described in which blocks with a double border also process AISG data. However, this is emphasized separately in the relevant context.

FIG. 1A shows a first embodiment of the heterogeneous mobile radio arrangement 1 according to the invention for supplying at least one mobile radio cell. This mobile radio arrangement 1 comprises at least one base station 2 (BTS), which is designed to generate mobile radio signals, which are emitted via at least one antenna arrangement 8. The base station 2 is also designed to process and evaluate received mobile radio signals. This base station 2 is indirectly or directly connected to the at least one antenna arrangement 8 via at least one shielded supply cable 3. The at least one antenna arrangement 8 comprises a multiplicity of radiating elements arranged in an antenna housing. The antenna arrangement 8 is designed to transmit and/or to receive preferably in two linear, circular or elliptical polarizations.

The at least one antenna arrangement 8 is for example arranged on an antenna mast 4 or an antenna holder. The antenna mast 4 comprises a first and an opposite, second end, wherein the first end is attached to a building structure and/or a foundation, the at least one antenna arrangement 8 preferably being arranged closer to the second end than to the first end. An antenna mast 4 need not, of course, necessarily be present. This wording only clarifies that the antenna arrangement 8 is physically spaced from the base station 2.

The at least one shielded supply cable 3 comprises a first and an opposite, second end 3a, 3b. The at least one supply cable 3 preferably extends at least over a partial length of the antenna mast 4 or the antenna holder and is further preferably designed to supply the at least one antenna arrangement 8 with electric power. In the embodiment shown in FIG. 1A, an AISG signal and mobile radio signals are also transmitted via the at least one shielded supply cable 3.

A multiplicity of supply cables 3 can also be provided, which are interconnected in series via electronic components. A multiplicity of shielded supply cables 3 can also be provided, all of which run in parallel upwardly and are used, for example, to transmit different polarizations of a mobile radio band. In particular, one end 3a, 3b of the at least one supply cable 3 may also be connected to a combiner (not shown).

In FIG. 1A the use of an AISG master 5 is also provided. It is integrated in this embodiment in the base station 2. This can be achieved, for example, via a software solution. In principle, the AISG master 5 could also be designed as separate hardware, i.e. as a separate device next to base station 2.

Furthermore, two AISG slaves 9, 9a, 9b are also provided in the embodiment. A first AISG slave 9, 9a is integrated in the at least one antenna arrangement 8. In this case it is an AISG-RET unit. The down-tilt angle can be adjusted via this first AISG slave 9, 9a. This makes it possible to change the cell illumination. The second AISG slave 9, 9b is arranged on the antenna mast 4 or the antenna holder. This AISG slave 9, 9b is an AISG-TMA (Tower-Mounted Amplifier). It can be switched on and off, for example, by the AISG master 5. AISG data can be transmitted on at least one shielded supply cable 3 between the AISG master 5 and the corresponding AISG slaves 9, 9a, 9b in an on/off keying procedure. These AISG data are marked by a dot and a dash in the drawings.

FIG. 1A also provides a first AISG converter 7a, which is connected to the AISG master 5 via a first signal line connection and which is indirectly connected to the first end 3a of the at least one shielded power cable 3 via a second signal line connection. The first AISG converter 7a is designed to perform a layer 1 conversion between both signal line connections and to transmit AISG data in an on/off keying procedure via the at least one shielded supply cable 3. For example, the AISG data are transmitted via an RS-485 bus from the AISG master 5 via the first signal line connection to the first AISG converter 7a. This converts the AISG data and transmits it in an on/off keying procedure via the at least one shielded supply cable 3.

FIG. 1A shows that the first AISG converter 7a is integrated in the base station 2. In principle, it could also be integrated in the AISG master 5. In this case, the integrated AISG converter 7a would have one signal line connection instead of two signal line connections.

FIG. 1A therefore includes base station 2, the AISG master 5 and the first AISG converter 7a. Both the AISG master 5 and the first AISG converter 7a can be provided in software in the base station 2.

FIG. 1A also shows a second AISG converter 7b, which is connected to the first AISG slave 9, 9a and the second AISG slave 9, 9b via at least (in each case) one first signal line connection. Via a second signal line connection it is again indirectly connected to the second end 3b of the at least one shielded supply cable 3. A "connection" shall be understood to mean an electrical connection.

The second AISG converter 7b is again designed to perform a layer 1 conversion between the two signal line connections and to transmit AISG data in an on/off keying procedure via the at least one shielded supply cable 3. The second AISG converter 7b transmits AISG data to the first AISG converter 7a, and vice versa.

In the embodiment from FIG. 1A, the second AISG converter 7b is arranged in or on the at least one antenna arrangement 8. It could also be integrated in the at least one AISG slave 9, 9a, 9b or arranged generally on the antenna holder.

In principle, the second AISG converter 7b is arranged between the second end 3b of the at least one shielded supply cable 3 and the at least one antenna arrangement 8.

Both the first AISG converter 7a and the second AISG converter 7b are designed to loop through mobile radio signals between their two signal line connections. The first AISG converter 7a therefore loops through mobile radio signals from base station 2 in the direction of the at least one first end 3a of the supply cable 3. The second AISG converter 7b loops through mobile radio signals from the second end 3b of the at least one supply cable 3 to the at least one antenna arrangement 8. The same is true for the reverse direction.

The second AISG converter 7b again performs an on/off keying procedure and forwards the AISG data, for example via an RS-485 bus, to the first and second AISG slave 9, 9a, 9b.

The heterogeneous mobile radio arrangement 1 according to the invention additionally comprises at least one first IP converter 10a and at least one second IP converter 10b. Furthermore, at least one first IP device 11 is also provided. Both IP converters 10a, 10b comprise a respective IP connection 30 (see, for example, FIG. 6) and at least one respective signal line connection 31a. The first IP converter 10a is connectable or connected by its IP connection 30 to the superordinate IP network 6 (electrically for example via a cable, optically for example via an optical waveguide or via radio), whereas the second IP converter 10b is connected by its IP connection 30 to the at least one first IP device 11.

The at least one signal line connection 31a of the first IP converter 10a (see FIG. 6) and the at least one signal line connection 31a of the second IP converter 10b (see FIG. 7) are, in this embodiment, directly electrically connected to the at least one shielded supply cable 3. This also applies if the AISG slave 9, 9b, which in this case is the AISG TMA (Tower-Mounted Amplifier), is arranged in the supply cable 3 and interrupts it so to speak (i.e. splits it into two parts). In the context of the invention, the supply cable 3 extends from the base station 2 to the antenna arrangement 8, although this supply cable 3 can also be interrupted (many times).

In the embodiment from FIG. 1A, the at least one first IP converter 10a comprises a further signal line connection 31b. This further signal line connection 31b is directly connected to the base station 2, whereas the at least one signal line connection 31a is connected to the first end 3a of the supply cable 3. The second IP converter 10b also additionally comprises a further signal line connection 31b. This further signal line connection 31b is directly connected to the antenna arrangement 8, whereas the at least one signal line connection 31a is directly connected to the second end 3b of the at least one supply cable 3. These signal line connections 31a, 31b are shown in FIGS. 6, 7 and 10 to 12. FIG. 6 shows the first IP converter 10a, and FIGS. 7 and 10 to 12 show the second IP converter 10b.

In the embodiment from FIG. 1A, the two IP converters 10a, 10b have three connections 30, 31a, 31b. The first IP converter 10a is connected to the superordinate IP network 6 via a router or switch 12.

The first IP converter 10a is designed to perform a layer 1 conversion between its IP connection 30 and its at least one signal line connection 31a, which is connected to the supply cable 3. The second IP converter 10b is also designed to perform a layer 1 conversion between its IP connection 30 and its at least one signal line connection 31a, which is connected to the at least one supply cable 3. The two IP converters 10a, 10b can transmit IP data via the supply cable 3 and via its respective at least one signal line connection 31a. Thus, the at least one IP device 11 can be connected to the superordinate IP network 6.

Layer 1 conversion is concerned, in particular, with the conversion of an Ethernet protocol into a narrowband IOT protocol.

The two IP converters 10a, 10b are designed, in particular, to process IP data in an IP4 protocol and/or in an IP6 protocol at their IP connections 30, and to convert said data into a corresponding narrowband IOT protocol.

The IP converters 10a, 10b can also be referred to as IP-SBT (Smart Bias Tee). The IP data are modulated by the IP converters 10a, 10b at their at least one signal line connection 31a onto a corresponding DC voltage in the shielded supply cable 3.

The first and the second IP converters 10a, 10b are designed to exchange IP data with each other via the at least one shielded supply cable 3. These IP data are transmitted with a frequency of less than 20 MHz, 15 MHz, 10 MHz, 5 MHz, 1 MHz, 750 kHz or 500 kHz. The preferred digital modulation is 8PSK modulation. It is also possible to use a digital modulation of a higher order, especially a QAM. The at least two IP converters 10a, 10b are designed to change, during operation, the modulation by which they transmit the IP data on the shielded supply cable 3. The modulation used may thus also depend on the connected IP device and its required bandwidth.

The first and second IP converters 10a, 10b are also designed to exchange with each other, via the at least one shielded supply cable 3, IP data having a signal level which is lower than the signal level of an AISG signal which can also be transmitted via the same at least one shielded supply cable 3. In particular, the signal level is preferably lower than −40 dBm, which in turn corresponds to the off level of an on/off keying signal. This ensures that no errors occur during the transmission of the additional IP data when transmitting the AISG signal.

The IP device 11 is, for example:
a) at least one temperature sensor; and/or
b) at least one brightness sensor; and/or
c) at least one GNSS sensor; and/or
d) at least one rain sensor; and/or
e) at least one wind sensor; and/or
f) at least one air pollution sensor; and/or
g) at least one air pressure sensor; and/or
h) at least one humidity sensor; and/or
i) at least one microcontroller; and/or
j) at least one webcam; and/or
k) at least one RET unit; and/or
l) at least one tower-mounted amplifier; and/or
m) at least one 5G repeater.

In order to be able to supply the at least one antenna arrangement 8 with electric power, the heterogeneous mobile radio arrangement 1 according to the invention also comprises at least one power supply device 22 (see FIG. 5C). This is designed to generate a corresponding supply voltage (for example DC voltage). The power supply device 22 is preferably integrated in the base station 2. Thus, the power supply device 22 is also connected directly or, as shown in FIG. 1A, indirectly via the at least one first IP converter 10a to the first end 3a of the at least one shielded supply cable 3. Because the second end 3b of the at least one shielded supply cable 3 is again indirectly connected to the at least one antenna arrangement 8 via the at least one second IP converter 10b, said antenna arrangement can be supplied with electric power as a result. The first and the second IP converter 10a, 10b are completely transparent with respect to the supply voltage and the AISG signal, as well as with respect to the mobile radio signals. Although the IP converters 10a, 10b are connected in series with the shielded supply cable 3 and the base station 2 and in series with the shielded supply cable 3 and the at least one antenna arrangement 8, they conduct the supply voltage, the AISG signal and corresponding mobile radio signals.

FIG. 1B shows a further embodiment of the mobile radio arrangement 1 according to the invention. The IP device 11 is a 5G repeater. It can be used, for example, in front- or backhauling in the millimeter range. The 5G repeater, i.e. the IP device 11, is connected to the second IP converter 10b. This second IP converter 10b comprises a (power) supply device 13 (see FIG. 6 and FIG. 7), via which the IP device 11 can be supplied with electric power. The second IP converter 10b is therefore designed to draw a supply voltage from the at least one shielded supply cable 3 and to make it available to the IP device 11, in particular via a Power-over-Ethernet standard, at its IP connection 30. In this way, both a data connection and a power supply can be achieved in a particularly simple manner.

Via the IP data, the 5G repeater can be controlled, in particular with regard to cell illumination, so that it changes this, or also provides status messages via the IP network 6.

FIG. 1B also shows that there is only one AISG slave 9. In this case, it can be seen that the at least one shielded supply cable 3 extends only between the IP converters 10a, 10b. The IP converters 10a, 10b are therefore (electrically) closer to the at least one supply cable 3 than the first and second AISG converters 7a, 7b.

The 5G repeater 11 can be mounted on the antenna mast 4 or on the antenna holder on which the at least one antenna arrangement 8 is also mounted.

FIG. 1C shows a further embodiment of the mobile radio arrangement 1 according to the invention. A further 5G repeater 15 is provided and arranged on another antenna mast 16 or antenna holder. The further 5G repeater 15 can be supplied with electric power via a further supply cable 17. Furthermore, a first further IP converter 18a is provided, which is connected by its IP connection to a further, superordinate IP network or the one superordinate IP network 6. A second further IP converter 18b is integrated in or arranged on the further 5G repeater 15. The two further IP converters 18a, 18b are designed to exchange IP data via their respective signal line connections over the further supply cable 17, whereby the 5G repeater 15 is connected or connectable to the superordinate IP network 6 or a further IP network. The further 5G repeater 15 is also supplied with power via the further supply cable 17.

A feed antenna is particularly preferably additionally provided on the antenna mast 4 or antenna holder at which the at least one antenna arrangement 8 is arranged. This feed antenna can be directed to the further 5G repeater 15 and can supply it in this way. This further 5G repeater 15 is therefore arranged at a distance from the at least one antenna arrangement 8, in particular on a separate antenna mast 16. The further 5G repeater 15 then distributes the signal from the feed antenna accordingly, thus ensuring that the surrounding areas are supplied with a high data rate.

In principle, a connection through which IP data are transmitted is represented in the drawings by a dash with two dots, whereas a connection through which AISG data are transmitted is represented by a dash with only one dot.

FIG. 2 shows a further embodiment according to the invention of the mobile radio arrangement 1. The second IP converter 10b is directly integrated into the at least one IP device 11. It could also be the other way round, i.e. the at least one IP device 11 could be integrated in the second IP converter 10b.

FIG. 3 shows a further embodiment according to the invention of the mobile radio arrangement 1. In this case, the IP device 11 is arranged on the top side of the at least one antenna arrangement 8 or at the second end of the antenna mast 4. The IP device 11 can be constituted, in principle, by one or more sensor clusters which, for example, determine the air quality in conjunction with the solar radiation and transmit these measurement data as IP data. In principle, a GNSS sensor, in particular in the form of a GPS sensor, can also be installed.

It is further shown that the second AISG converter 7b and the second IP converter 10b are integrated in a common device.

This common device, in addition to an IP connection 30 for connection to the IP device 11, also comprises an AISG connection for connection to the at least one AISG slave 9, 9a, 9b. The power supply of the AISG slave 9, 9a, 9b can be provided via this common device, in exactly the same way as the power supply of the IP device 11.

Figure 4:
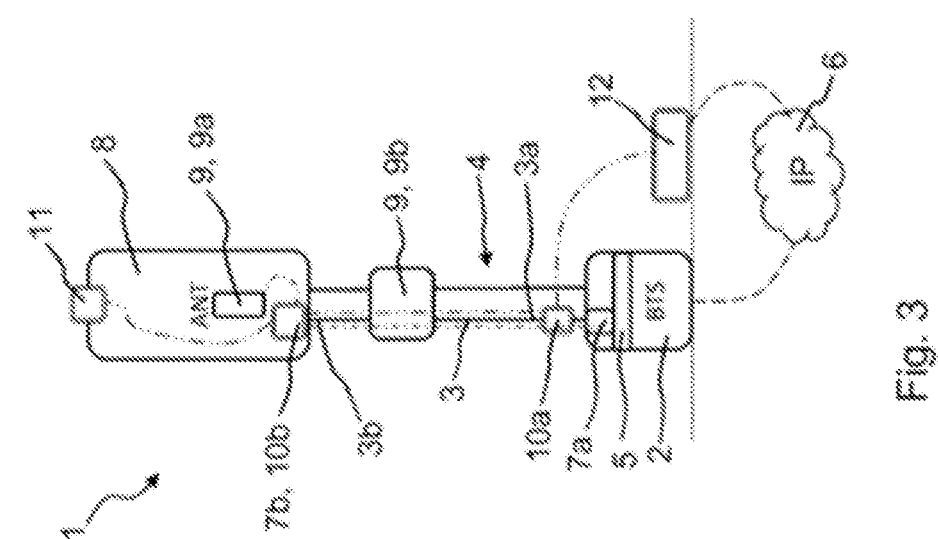

FIG. 4 shows a further embodiment according to the invention of the mobile radio arrangement 1. In this case, the first IP converter 10a and the first AISG converter 7a are also integrated in a common device. This common device is preferably also integrated in the base station 2. The connection to the superordinate IP network 6 is made via the base station 2, which is also connected to the superordinate IP network 6.

The second AISG slave 9, 9b from FIG. 3, which is an AISG-TMA, has been replaced by another IP device 11, 11b. In this case, reference is no longer made to an AISG-TMA, but rather to an IP-TMA, which can include additional functions that are not necessarily related to the operation of a mobile network. For example, it may also have a sensor cluster. In this case, the AISG-RET unit 9, 9a is the only AISG device. All other antenna line devices communicate via the IP converters 10a, 10b by means of an IP protocol.

FIG. 5A shows a further embodiment according to the invention of the mobile radio arrangement 1. In this case, the entire AISG protocol is omitted. There is neither an AISG master 5, nor a first or second AISG converter 7a, 7b. Also, a corresponding AISG slave 9 is no longer available. Instead, an IP-RET unit 11c is used as a further IP device 11, which is controlled via the first and second IP converter 10a, 10b. Furthermore, the IP-TMA 11b is intended as a further IP device 11. An additional sensor 11a is also provided.

In this case, the heterogeneous mobile radio arrangement 1 can also be referred to as an IP Antenna Line Network (iPAN). All network components are connected via the IP converters 10a, 10b (All-IP).

FIG. 5B shows a further embodiment of the mobile radio arrangement 1 according to the invention. In particular, the IP device 11, 11b is a camera 11b, such as a webcam for site recording. It can, for example, display the antenna mast 4 together with the base station 2. The other IP device 11, 11a is, for example, a GNSS sensor 11a, which is arranged on the top side of at least one antenna arrangement 8.

FIG. 5C illustrates another embodiment according to the invention of the mobile radio arrangement 1. In this case, an IP antenna arrangement 20 is also provided, which is arranged at, in, or on the at least one antenna arrangement 8 or on the antenna mast 4 or antenna holder. The first IP converter 10a is connected by its IP connection 30 to the IP antenna arrangement 20 and is designed to establish a connection to the superordinate IP network 6 via the IP antenna arrangement 20. This is achieved via a radio link. The first IP converter 10a is again connected via its at least one signal line connection 31a to the at least one signal line connection 31a of the second IP converter 10b, which is integrated in the IP device 11. This connection is established via the at least one shielded supply cable 3 or via a part of the at least one shielded supply cable 3. In this case, the base station 2 is only used to generate a voltage supply, which is in particular a DC voltage. In principle, mobile radio signals could also be transmitted. The radio link between the IP antenna arrangement 20 and a corresponding antenna arrangement 21, which is connected to the superordinate IP network 6, could be an LTE connection, for example.

FIG. 6 shows an exemplary structure of the first IP converter 10a. The first IP converter 10a comprises a power supply 13 and an IP modem 25. Here, the power supply 13 supplies the IP modem 25 with electric power, the power supply 13 receiving this electric power from the at least one supply cable 3 via the further signal line connection 31b.

Furthermore, three connections 30, 31a, 31b are provided. An IP connection 30 is used for connection to the superordinate IP network 6. A signal line connection 31a is used for direct or indirect connection to the first end 3a of the at least one supply cable 3. A further signal line connection 31b is used for indirect or direct connection to the base station 2. The two signal connections 31a, 31b are connected to each other in such a way that at least one supply voltage, an AISG signal, and mobile radio signals can be looped through from the further signal line connection 31b to the at least one signal line connection 31a. The same also applies for the opposite direction.

The IP modem 25, on the other hand, is connected to the at least one signal line connection 31a in such a way that IP data can be output to, and received from, this at least one signal line connection 31a. The IP modem 25 is designed, in particular, to modulate these data onto the DC voltage which is looped through from the further signal line connection 31b to the at least one signal line connection 31a.

Preferably, both IP converters 10a, 10b comprise a waterproof or moisture-proof housing. The IP connection 30 can produce an electrical or optical connection to the superordinate IP network 6. A radio-based connection would also be possible.

Curly brackets indicate the components to which the connections 31a, 31b are connected.

Figure 7:
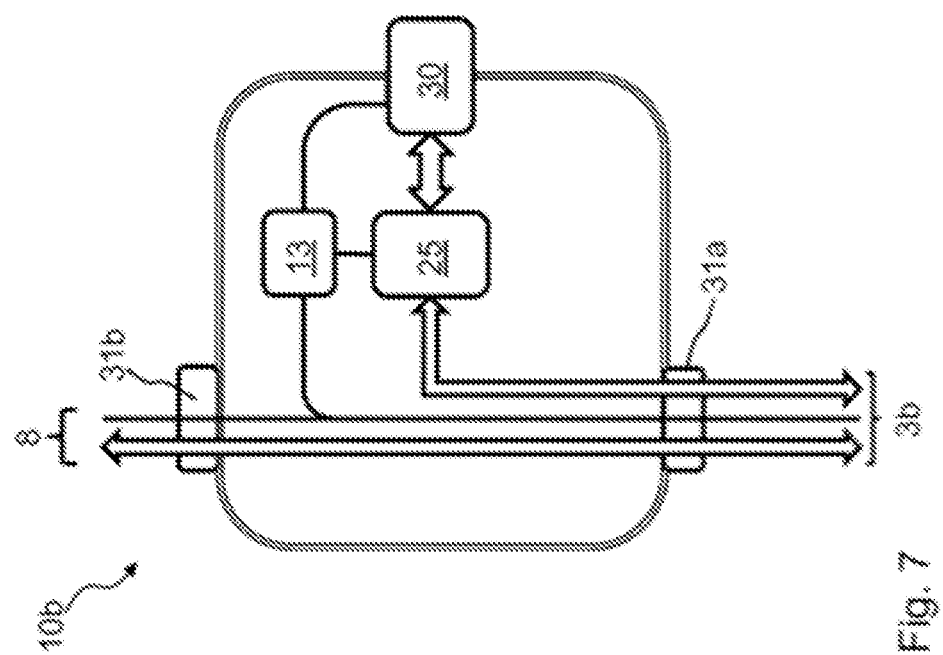

FIG. 7 shows an embodiment of the second IP converter 10b. This likewise comprises an electric supply device 13 (power supply) and an IP modem 25. The IP modem 25 is connected to the IP connection 30 so that the IP modem 25 can output or receive data via the IP connection 30. The electric supply device 13 is designed to supply the IP modem 25 with electric power. The electric supply device 13 draws this power from the at least one shielded supply cable 3. The electric supply device 13 is additionally designed to provide electric power via the IP connection 30 so that the at least one IP device 11 thus can be operated.

In this embodiment, the second IP converter 10b also comprises three connections 30, 31a, 31b. In addition to the IP connection 30, there is also at least one signal line connection 31a and a further signal line connection 31b. The at least one signal line connection 31a is connectable or connected indirectly or directly to the second end 3b of the at least one shielded supply cable 3. The further signal line connection 31b is indirectly or directly connected to the at least one antenna arrangement 8. In the case of a direct connection, the connection is made directly to the at least one antenna arrangement 8. In case of an indirect connection, other electrical components, such as combiners or the AISG converter 7b, can be arranged in between.

The second IP converter 10b is designed to loop through an electric supply voltage, AISG signals and/or mobile radio signals from the at least one signal line connection 31a to the further signal line connection 31b (the same applies in the reverse direction). The IP modem 25 is designed to output the IP data to the at least one signal line connection 31a and to receive IP data from the at least one signal line connection 31a. Here too, the IP data are preferably modulated onto the electric supply voltage (DC voltage), which is transmitted via the at least one shielded supply cable 3.

FIG. 8A shows an IP switch 35. This comprises at least three signal line connections 35a, 35b, 35c. The IP data can be looped through at least from one signal line connection 35a to a further signal line connection 35c. The AISG data are, instead, transmitted from the first signal line connection 35a only to the second signal line connection 35b, but not to the third signal line connection 35c. By contrast, the IP data are only transmitted from the first signal line connection 35a to the third signal line connection 35c, but not to the second signal line connection 35b. The electric supply voltage, by contrast, is transmitted between all three signal line connections 35a, 35b, 35c. The mobile radio signals are also preferably transmitted only between the first signal line connection 35a and the second signal line connection 35b. An IP switch 35 does not perform layer 1 conversion. The IP switch 35 can also be described as an IP-BT (IP Bias Tee). Such an IP switch 35 can comprise appropriate filters, which ensure that only certain signal components are output at certain signal line connections 35a, 35b, 35c.

When using such an IP switch 35 between the base station 2 and the first end 3a of the at least one shielded supply cable 3 or between the second end 3b of the shielded supply cable 3 and the at least one antenna arrangement 8, a corresponding IP converter 10a, 10b may have less than three connections 30, 31a, 31b. Thus, the first IP converter 10a, which is used to establish a connection to a superordinate IP network 6, may only have two connections 30, 31a, whereas the second IP converter 10b, which is used for connection to an IP device 11, may also only have one signal line connection 31a according to FIG. 9.

FIG. 8B shows a different embodiment of the IP switch 35. In this case, the IP data are exchanged between all connections 35a, 35b, 35c. The same applies also for the electric supply voltage. Only the AISG signal and/or the mobile radio signal are looped through between two connections 35a and 35b. The AISG signal and/or the mobile radio data are not available at the third signal line connection 35c. This selective choice can, again, be made using appropriate filters.

FIG. 9 shows a further embodiment, which shows that the second IP converter 10b and the at least one IP device 11 are accommodated in a common device or housing. This device only includes a signal line connection 31a accessible from outside, via which at least the electric supply voltage and IP data can be supplied. This common device in turn comprises an electric supply device 13 and an IP modem 25. Furthermore, an IP device 11 in the form of a microcontroller 11b is provided, which is designed to exchange data with the IP modem 25 and a sensor or sensor cluster 11a. Both the microcontroller 11b as well as the at least one sensor 11a can be considered together to be an IP device 11. The second IP connection 30 between the IP modem 25 and the microcontroller 11b is shown. The electric supply device 13 is also used to supply at least the microcontroller 11b and/or the at least one sensor 11a with electric power. This can also be done via Power-over-Ethernet or another interface. This common device, which only has one signal line connection 31a, can also be referred to as an end node in an IP network. It therefore does not have any connections leading outwardly. In particular, it is connected to a corresponding IP switch 35.

Figure 10:
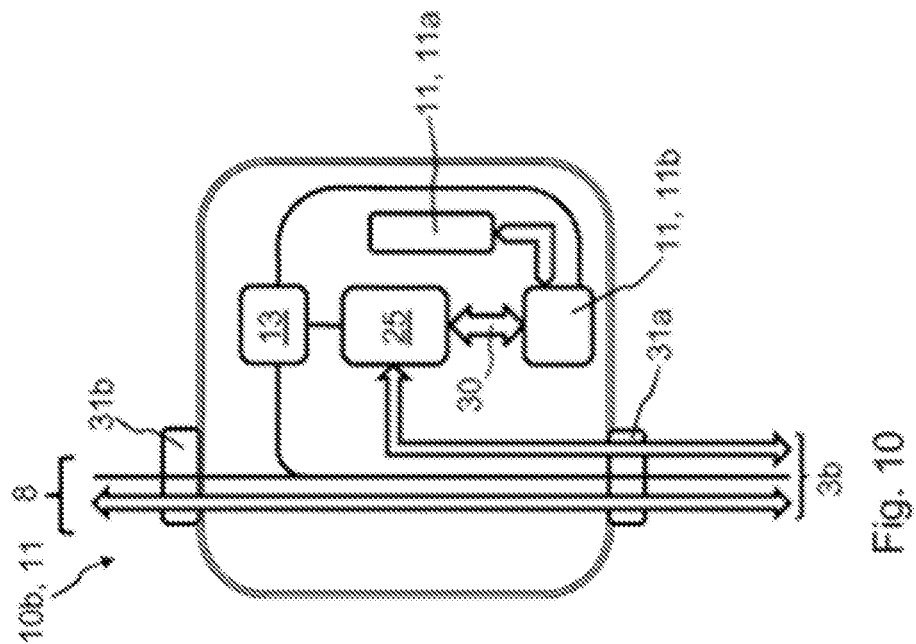

The situation is different in the embodiment according to FIG. 10. Here too, the at least one second IP converter 10b is integrated together with the IP device 11 in a common device. However, this common device has, in addition to the at least one signal line connection 31a, also a further signal line connection 31b. This common device can be used, for example, between the second end 3b of the at least one supply cable 3 and the at least one antenna arrangement 8. At least one electric supply voltage, an AISG signal and/or mobile radio signals can be looped through between the two signal line connections 31a and 31b. Modulated IP data streams are preferably decoupled and fed to the IP modem 25, which converts them (layer 1 conversion) and forwards them to appropriate IP devices 11. In this embodiment, the IP data are not looped through from at least one signal line connection 31a to the further signal line connection 31b.

Figure 11A:
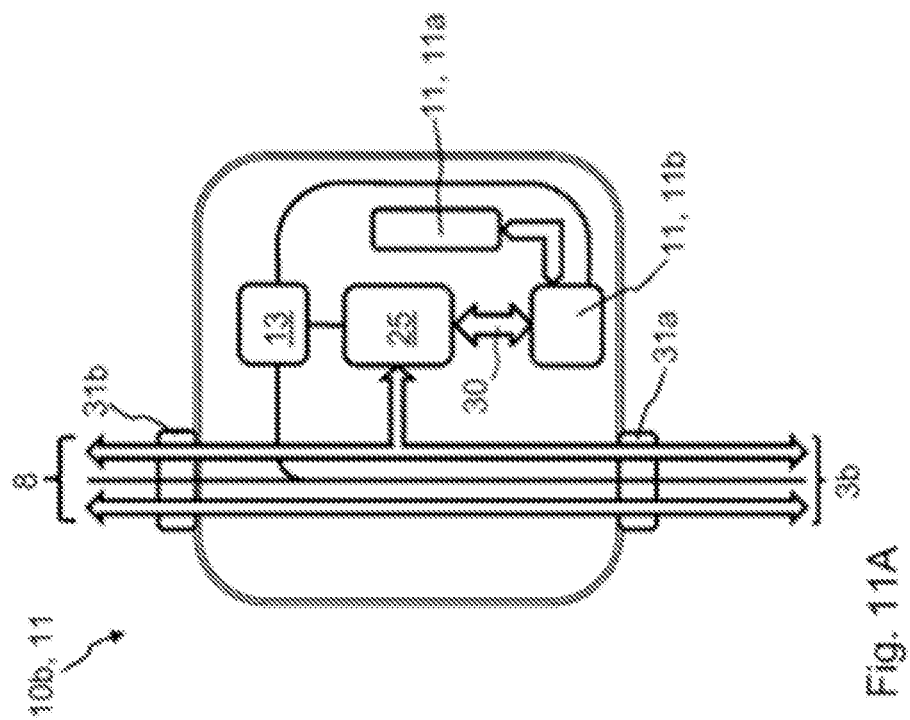

This is only done in the embodiment from FIG. 11A. In this case, both the electric supply voltage as well as the AISG signal, the mobile radio signals and the IP data are looped through from the at least one signal line connection 31a to the further signal line connection 31b (and vice versa). The IP data are uncoupled and supplied to the IP modem 25. The same applies also for the electric supply voltage, which is fed to an electric supply device 13, which in turn supplies the IP device 11 with electric power.

FIG. 11B shows a refinement of the embodiment from FIG. 11A. In addition to IP data, which are fed to the IP modem 25, AISG data are also uncoupled and supplied to an AISG modem 41. The AISG modem 41 is in turn connected to the at least one IP device 11, in particular the microcontroller 11b. The electric supply device 13 supplies the IP tool 11, consisting of the microcontroller 11b and at least one sensor or a sensor cluster 11a as well as the AISG modem 41. Of course, the IP modem 25 is also supplied with electric power by the electric supply device 13. In this case, it is possible to communicate with the IP device 11 both via an AISG signal as well as via an IP signal.

FIG. 12 shows a further embodiment. In this case, a multiplicity of sensors and/or actuators are used as IP devices 11. The microcontroller 11b, which is connected to the IP modem 25 for data exchange, controls, for example, an actuator 11a (for example an IP-RET unit). This IP tool can, of course, also be a sensor. At the same time, the microcontroller 11b is also connected to another IP device 11c, which in this case is an integrated image sensor (webcam). This serves, for example, to monitor the installation site and can be used within the scope of ensuring public safety.

In principle, the IP-RET unit 11a can be, for example, a single-RET or multi-RET unit, which is integrated or can be replaced in the field.

FIG. 13 shows a short overview indicating in which frequency ranges and at which signal levels the IP data can be transmitted in a narrowband IOT protocol via the at least one shielded supply cable 3. A section of the "Spectrum Emission Mask" for an ASIG modem 41, which is anchored in the AISG standard, is shown. The continuous line indicates the maximum spectral power which may be emitted from the AISG modem 41, which is contained in the first and second AISG converter 7a, 7b, onto the at least one shielded supply cable 3.

If the AISG modem 41 sends an on signal, the level of +5 dBm must not be exceeded at the transmission frequency of 2.176 MHz. With an off signal, the level must be s 40 dBm (dashed line).

The first and the second IP converter 10a, 10b are designed, in particular, in such a way that these IP data are transmitted on the at least one shielded supply cable 3 and their signal power is below the off-AISG signal. Preferably, the IP data are also transmitted below a frequency of 20 MHz, 15 MHz, 12.5 MHz, 10 MHz, 5 MHz, 1 MHz, 750 kHz, or 500 kHz. Since high data rates are rarely required for such applications, a modulation method should be used which is robust and requires only a small bandwidth, so that the mobile radio signals, which are usually well above 20 MHz, are not disturbed.

The invention is not limited to the described embodiments. All described and/or drawn features can be combined with each other arbitrarily within the scope of the invention.

The invention claimed is:

1. A heterogeneous mobile radio arrangement for supplying at least one mobile radio cell with mobile radio services, comprising the following features:
    at least one antenna arrangement is provided, wherein the at least one antenna arrangement comprises a multiplicity of radiating elements which are arranged in an antenna housing, and wherein the antenna arrangement is designed to transmit and/or to receive;
    at least one antenna mast or an antenna holder having a first and a second end is provided, wherein the first end is attached or attachable to a building structure and/or a foundation, and wherein the at least one antenna arrangement is attached closer to the second end than to the first end; and
    at least one shielded supply cable having a first and an opposite, second end is provided, which shielded supply cable is designed to supply the at least one antenna arrangement with electric power, wherein an Antenna Interface Standards Group (AISG) signal and mobile radio signals are transmittable via the at least one shielded supply cable;
characterized by the following features:
    at least one first and one second Internet Protocol (IP) converter and at least one first IP device are provided, wherein both IP converters have a respective IP connection and at least one respective signal line connection;
    the first IP converter is connectable or connected by its IP connection to a superordinate IP network, and the second IP converter is connected by its IP connection to the at least one first IP device; and
    the at least one signal line connection of the first IP converter and the at least one signal line connection of the second IP converter are electrically connected directly or indirectly to the at least one shielded supply cable, via which the AISG signal and the mobile radio signals can also be transmitted, whereby IP data can be exchanged between the superordinate IP network and the at least one first IP device.

2. The heterogeneous mobile radio arrangement according to claim 1, characterized by the following features:
    the first IP converter is designed to perform a layer 1 conversion between its IP connection and its at least one signal line connection; and/or
    the second IP converter is designed to perform a layer 1 conversion between its IP connection and its at least one signal line connection.

3. The heterogeneous mobile radio arrangement according to claim 2, characterized by the following features:
    the layer 1 conversion comprises the conversion of an Ethernet protocol into a narrowband Internet of Things (IOT) protocol.

4. The heterogeneous mobile radio arrangement according to claim 1, characterized by the following feature:
    the first and the second IP converter are designed to process data in an IP4 protocol and/or IP6 protocol at their IP connections.

5. The heterogeneous mobile radio arrangement according to claim 1, characterized by the following feature:
    the first and the second IP converter are designed to exchange IP data with each other via the at least one shielded supply cable, the data being transmitted at a frequency of less than 20 MHz, 15 MHz, 10 MHz, 5 MHz, 1 MHz, 750 kHz or 500 kHz.

6. The heterogeneous mobile radio arrangement according to claim 1, characterized by the following feature:
the first and the second IP converter are designed to exchange IP data with each other via the at least one shielded supply cable, the signal level being lower than the signal level of an AISG signal which can also be transmitted via the same at least one shielded supply cable.

7. The heterogeneous mobile radio arrangement according to claim 1, characterized by the following feature:
the at least one second IP converter is integrated in the at least one first IP device.

8. The heterogeneous mobile radio arrangement according to claim 1, characterized by the following features:
an IP antenna arrangement is provided, which is arranged at, in, or on the at least one antenna arrangement or on the antenna mast or antenna holder; and
the first IP converter is connected by its IP connection to the IP antenna arrangement and is designed to establish a connection to the superordinate IP network via the IP antenna arrangement, wherein the superordinate IP network is connectable or connected to the at least one first IP device via the at least one signal line connections of the first and second IP converter.

9. The heterogeneous mobile radio arrangement according to claim 1, characterized by the following features:
the at least one first IP device is:
a) at least one temperature sensor; and/or
b) at least one brightness sensor; and/or
c) at least one Global Navigation Satellite System (GNSS) sensor; and/or
d) at least one rain sensor; and/or
e) at least one wind sensor; and/or
f) at least one air pollution sensor; and/or
g) at least one air pressure sensor; and/or
h) at least one humidity sensor; and/or
i) at least one microcontroller; and/or
j) at least one webcam; and/or
k) at least one Remote Electrical Tilting (RET) unit; and/or
l) at least one tower-mounted amplifier; and/or
m) at least one Fifth Generation (5G) repeater.

10. The heterogeneous mobile radio arrangement according to claim 1, characterized by the following features:
the at least one first IP device is the 5G repeater, wherein the 5G repeater is arranged on the antenna mast or antenna holder with the at least one antenna arrangement; and/or
a further 5G repeater is provided and is arranged at another antenna mast or antenna holder, wherein the further 5G repeater is supplied with power via a further supply cable, and wherein:
a) a feed antenna is provided on the antenna mast or antenna holder with the at least one antenna arrangement, which feed antenna is directed towards the further 5G repeater and feeds it; and/or
b) a first further IP converter is provided, which is connected by its IP connection to the superordinate IP network or a further superordinate IP network, and wherein a second, further IP converter is provided, which is integrated in or arranged at the further 5G repeater, wherein the two further IP converters are designed to exchange IP data via their signal line connections and the further supply cable, whereby the further 5G repeater is connected or connectable to the superordinate IP network or the further superordinate IP network.

11. The heterogeneous mobile radio arrangement according to claim 1, characterized by the following features:
a power supply device is provided, which is designed to generate a supply voltage; and
the power supply device is connected indirectly or directly to a first end of the at least one shielded supply cable, wherein a second end of the at least one shielded supply cable is connectable indirectly or directly to the at least one antenna arrangement, via which the antenna arrangement can be supplied with electric power.

12. The heterogeneous mobile radio arrangement according to claim 11, characterized by the following features:
the first IP converter is arranged between the power supply device and the first end of the at least one shielded supply cable, wherein it is connected by its at least one signal line connection indirectly or directly to the first end of the at least one shielded supply cable; and
the first IP converter is designed to loop through the supply voltage from the power supply device to the first end of the at least one shielded supply cable.

13. The heterogeneous mobile radio arrangement according to claim 12, characterized by the following feature:
the first IP converter is integrated in the power supply device or is designed as separate hardware next to the power supply device.

14. The heterogeneous mobile radio arrangement according to claim 12, characterized by the following features:
a first IP switch is provided, which is arranged between the power supply device and the first end of the at least one shielded supply cable; and
the first IP converter is connected to the first IP switch, wherein the first IP switch is designed to:
a) loop through the supply voltage from the power supply device to the first end of the at least one shielded supply cable; and
b) transmit IP data between the first IP converter and the first end of the shielded supply cable, whereby the first IP converter is indirectly connected to the first end of the shielded supply cable.

15. The heterogeneous mobile radio arrangement according to claim 11, characterized by the following features:
the second IP converter is arranged between the second end of the at least one shielded supply cable and the at least one antenna arrangement, wherein the second IP converter is connected by its at least one signal line connection indirectly or directly to the second end of the at least one shielded supply cable and is designed to loop through the supply voltage from the second end of the at least one shielded supply cable to the at least one antenna arrangement; or
a second IP switch is provided, which is arranged between the second end of the at least one shielded supply cable and the at least one antenna arrangement, wherein the second IP converter is connected to the second IP switch and is designed to:
a) loop through the supply voltage from the second end of the at least one shielded supply cable to the at least one antenna arrangement; and
b) transmit IP data between the second IP converter and the second end of the shielded supply cable, whereby the second IP converter is indirectly connected to the second end of the shielded supply cable.

16. The heterogeneous mobile radio arrangement according to claim 15, characterized by the following feature:
the second IP converter comprises a supply device, which is designed to draw the supply voltage from the at least one shielded supply cable and to make it available to the at least one first IP device, for example via Power-over-Ethernet, at its IP connection.

17. The heterogeneous mobile radio arrangement according to claim 1, characterized by the following features:
a base station is provided;
the at least one shielded supply cable is connected by its first end indirectly or directly to the base station and by its second end indirectly or directly to the at least one antenna arrangement;
an AISG master is provided, wherein the AISG master:
  a) is integrated in the base station; or
  b) is designed as separate hardware next to the base station;
at least one AISG slave is provided, wherein the at least one AISG slave:
  a) is integrated in the at least one antenna arrangement; and/or
  b) is arranged on the antenna mast or the antenna holder; and
AISG data can be transmitted on the at least one shielded supply cable between the AISG master and the at least one AISG slave in an ON/OFF keying procedure.

18. The heterogeneous mobile radio arrangement according to claim 17, characterized by the following features:
a first AISG converter is provided, which is connected to the AISG master via a first signal line connection and is connected indirectly or directly to the first end of the at least one shielded supply cable via a second signal line connection; and
the first AISG converter is designed to perform a layer 1 conversion between both signal line connections and to transmit AISG data via the at least one shielded supply cable in an ON/OFF keying procedure.

19. The heterogeneous mobile radio arrangement according to claim 18, characterized by the following features:
the first AISG converter is:
  a) integrated in the AISG master and designed to receive AISG data from the AISG master via its second signal line connection; or
  b) designed as separate hardware next to the AISG master and connected via its first signal line connection to the AISG master.

20. The heterogeneous mobile radio arrangement according to claim 18, characterized by the following feature:
the first AISG converter is arranged between the base station and the first end of the at least one shielded supply cable and is designed to loop through mobile radio signals between the base station and the first end of the at least one shielded supply cable.

21. The heterogeneous mobile radio arrangement according to claim 18, characterized by the following features:
a first AISG switch is provided, which is arranged between the base station and the first end of the at least one shielded supply cable; and
the first AISG converter is connected to the first AISG switch, wherein the first AISG switch is designed to:
  a) loop through mobile radio signals between the base station and the first end of the at least one shielded supply cable; and
  b) transmit AISG data between the first AISG converter and the first end of the shielded supply cable, whereby the first AISG converter is indirectly connected to the first end of the shielded supply cable.

22. The heterogeneous mobile radio arrangement according to claim 18, characterized by the following features:
the at least one AISG slave is arranged between the second end of the at least one shielded supply cable and the at least one antenna arrangement; and
the at least one AISG slave is designed to:
  a) perform an ON/OFF keying procedure to receive AISG data directly from the first AISG converter; and
  b) to loop through mobile radio signals between the second end of the at least one shielded supply cable to the at least one antenna arrangement.

23. The heterogeneous mobile radio arrangement according to claim 18, characterized by the following features:
a second AISG converter is provided, which is connected to the at least one AISG slave via a first signal line connection and is connected indirectly or directly to the second end of the at least one shielded supply cable via a second signal line connection;
the second AISG converter is designed to perform a layer 1 conversion between both signal line connections and to transmit AISG data via the at least one shielded supply cable in an ON/OFF keying procedure; and
the second AISG converter is:
  a) integrated in the at least one AISG slave; or
  b) arranged in or at the at least one antenna arrangement; or
  c) arranged on the antenna mast or antenna holder.

24. The heterogeneous mobile radio arrangement according to claim 23, characterized by the following feature:
the second AISG converter is arranged between the second end of the at least one shielded supply cable and the at least one antenna arrangement and is designed to loop through mobile radio signals between the second end of the at least one shielded supply cable and the at least one antenna arrangement; or
a second AISG switch is provided, which is arranged between the second end of the at least one shielded supply cable and the at least one antenna arrangement, the second AISG converter being connected to the second AISG switch, and the second AISG switch being designed to:
  a) loop through mobile radio signals between the second end of the at least one shielded supply cable and the at least one antenna arrangement; and
  b) transmit AISG data between the second AISG converter and the second end of the shielded supply cable, whereby the second AISG converter is indirectly connected to the second end of the shielded supply cable.

25. The heterogeneous mobile radio arrangement according to claim 18, characterized by the following features:
the at least one first AISG converter and the at least one first IP converter are integrated in a common device; and/or
the at least one second AISG converter and the at least one second IP converter are integrated in a common device.

26. The heterogeneous mobile radio arrangement according to claim 18, characterized by the following feature:
the power supply device is integrated in the base station.

27. The heterogeneous mobile radio arrangement according to claim 1, characterized by the following feature:
the at least one first IP device is integrated in the second IP converter; or the second IP converter is integrated in the at least one first IP device.

28. The heterogeneous mobile radio arrangement according to claim 1, characterized by the following feature:
the first IP converter and/or the second IP converter comprise a power supply and an IP modem.

\* \* \* \* \*